(12) United States Patent
Wien

(10) Patent No.: US 11,053,443 B2
(45) Date of Patent: Jul. 6, 2021

(54) MICROWAVE PYROLYSIS REACTOR

(71) Applicant: Scanship AS, Tonsberg (NO)

(72) Inventor: Asgeir Wien, Vollen (NO)

(73) Assignee: Scanship AS, Tonsberg (NO)

(*) Notice: Subject to any disclaimer, the term of this patent is extended or adjusted under 35 U.S.C. 154(b) by 0 days.

(21) Appl. No.: 16/498,445

(22) PCT Filed: Mar. 26, 2018

(86) PCT No.: PCT/EP2018/057616
§ 371 (c)(1),
(2) Date: Sep. 27, 2019

(87) PCT Pub. No.: WO2018/177997
PCT Pub. Date: Oct. 4, 2018

(65) Prior Publication Data
US 2020/0102502 A1    Apr. 2, 2020

(30) Foreign Application Priority Data

Mar. 27, 2017 (NO) .................................... 20170495

(51) Int. Cl.
| | | |
|---|---|---|
| C10B 19/00 | (2006.01) | |
| B01J 19/12 | (2006.01) | |
| C10B 53/00 | (2006.01) | |

(52) U.S. Cl.
CPC ............ C10B 19/00 (2013.01); B01J 19/126 (2013.01); C10B 53/00 (2013.01); *B01J 2219/00162* (2013.01); *B01J 2219/00256* (2013.01)

(58) Field of Classification Search
CPC ......... C10B 19/00; C10B 53/00; B01J 19/126
See application file for complete search history.

(56) References Cited

U.S. PATENT DOCUMENTS

| | | |
|---|---|---|
| 3,843,457 A | 10/1974 | Grannen et al. |
| 4,823,711 A | 4/1989 | Kroneberger et al. |

(Continued)

FOREIGN PATENT DOCUMENTS

| | | | | |
|---|---|---|---|---|
| CN | 101392189 | | 3/2009 | |
| CN | 102580650 A | * | 2/2012 | ............ B01J 19/12 |

(Continued)

OTHER PUBLICATIONS

Espacenet Translation of CN 102580650A Obtained Aug. 25, 2020. (Year: 2020).*

(Continued)

*Primary Examiner* — Jonathan Miller
(74) *Attorney, Agent, or Firm* — Christian D. Abel

(57) ABSTRACT

The present invention provides a microwave pyrolysis reactor (1) comprising an inner pipe element (2) and a housing (4), wherein the inner pipe element (2) is made of a microwave transparent material and comprises a first open end (5) and a second open end (6); the housing (4) comprises a first inner surface, enclosing an annular space (7,44) around the inner pipe element (2), a waste inlet (10), a solids outlet (11), a gas outlet (12), an inert gas inlet (45) and a port (13) for a microwave waveguide (14), the waste inlet and the solids outlet are in communication with the first open end and the second open end of the inner pipe element, respectively, and the port for a microwave waveguide is in communication with the annular space; and wherein the inner pipe element is arranged with the first open end at a higher vertical level than the second open end, such that a material entering the waste inlet during use is transported through the inner pipe element, from the first open end to the second open end, by gravity; and wherein the gas outlet (12) is arranged upstream the first open end of the inner pipe element and downstream the waste inlet of the housing, and (Continued)

the inert gas inlet (45) is arranged to provide an inert gas into the annular space (7,44) during use.

10 Claims, 3 Drawing Sheets

(56) References Cited

U.S. PATENT DOCUMENTS

| | | | |
|---|---|---|---|
| 5,366,595 A | | 11/1994 | Padgett et al. |
| 5,653,183 A | * | 8/1997 | Hansen ............... C10B 7/10 110/229 |
| 5,868,085 A | * | 2/1999 | Hansen ............... C10B 7/10 110/346 |
| 5,902,510 A | * | 5/1999 | Balbaa ............... H05B 6/78 219/698 |
| 8,382,957 B2 | * | 2/2013 | Farneman ............ B01J 19/12 202/84 |
| 9,545,609 B2 | * | 1/2017 | Van Thorre .......... B01J 8/10 |
| 2006/0016305 A1 | | 7/2006 | Ershag |
| 2008/0099325 A1 | * | 5/2008 | Ludlow-Palafox ..... C10B 53/07 204/157.43 |
| 2011/0036706 A1 | * | 2/2011 | Van Thorre ........... C10G 1/02 204/157.15 |
| 2011/0192989 A1 | * | 8/2011 | Yaniv ................. H05B 6/78 250/453.11 |
| 2011/0219679 A1 | * | 9/2011 | Budarin ............... C10B 53/02 44/605 |
| 2013/0144095 A1 | | 6/2013 | Farneman |
| 2016/0348211 A1 | | 12/2016 | Ugolin |
| 2018/0058382 A1 | * | 3/2018 | Chandran ............. C10J 3/723 |
| 2018/0094731 A1 | * | 4/2018 | Schlutter ............ F16K 3/0227 |

FOREIGN PATENT DOCUMENTS

| | | |
|---|---|---|
| CN | 102533293 | 7/2012 |
| CN | 102580650 | 6/2013 |
| CN | 105586095 | 5/2016 |
| CN | 205948872 | 2/2017 |
| CN | 103923673 | 7/2017 |
| DE | 4327958 | 11/1994 |
| JP | 2003-207103 | 7/2003 |

OTHER PUBLICATIONS

Office Action from Patent Office of PRC dated Oct. 22, 2020 with Search Report, cited inter alia as a Statament of Relevance for non-English references cited therein, including CN102580650 filed previously.

* cited by examiner

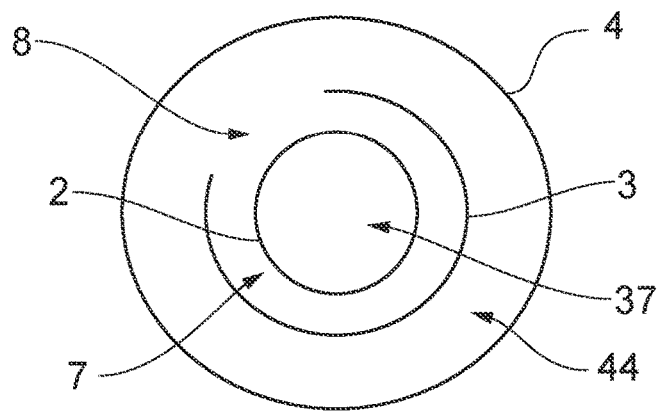
FIG. 2 (A-A)
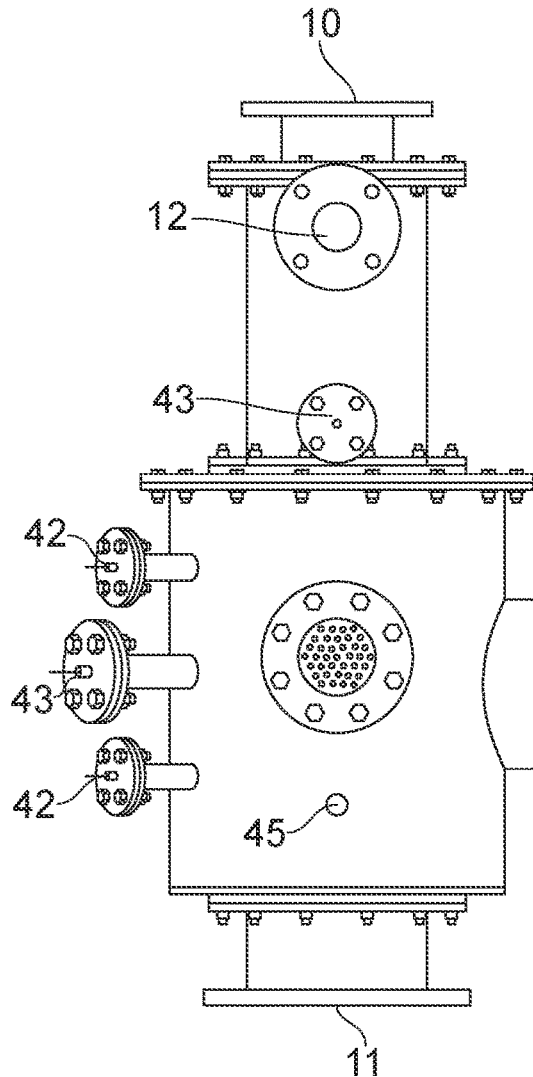
FIG. 3
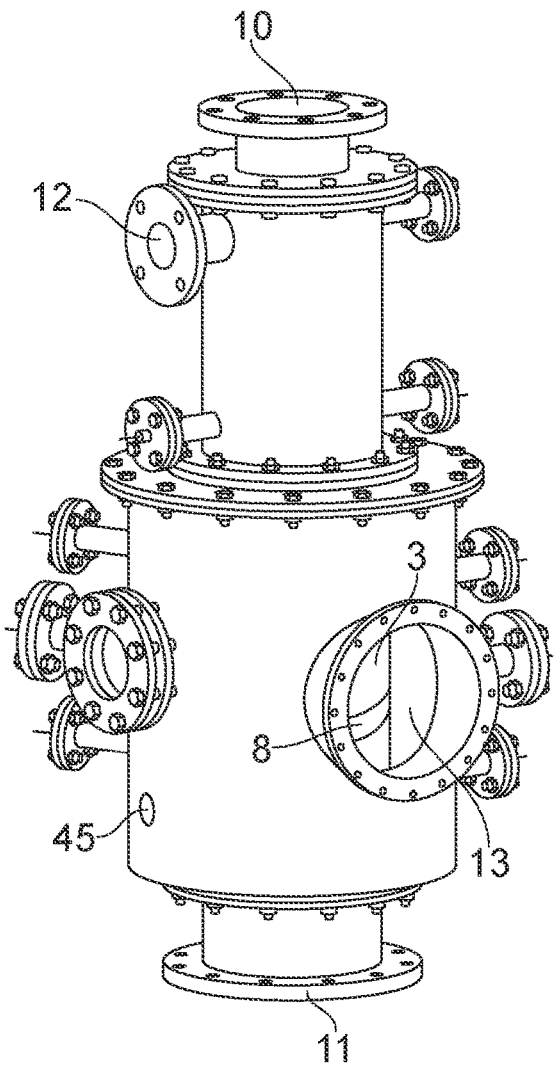
FIG. 4

MICROWAVE PYROLYSIS REACTOR

TECHNICAL FIELD

The present invention relates to the field of microwave-assisted pyrolysis reactors, and more particularly to a microwave pyrolysis reactor for waste disposal, use of such a microwave reactor in a waste disposal system and the waste disposal system comprising the microwave reactor.

BACKGROUND

Waste disposal and management off-shore, for instance on ships, is commonly obtained by combining the use of incinerators, collection of waste such as cooking oil, oil sludge, paper, plastics, cardboard and wood pallets for subsequent weekly landing on-shore, as well as the discharge of sewage sludge and food waste to sea.

Consequently, the environmental footprint is quite large, especially in areas where the shipping traffic is high. This is especially noticeable in connection with cruise ships, wherein certain ports and ocean regions have numerous legislations prohibiting discharge to sea, as well as flue gas emissions. The latter prohibition applies to ships at port, and thus restricts the use of on-ship incinerators. Many of the same problems and issues regarding waste disposal and management are found in rural areas, islands and similar sites where access to large-scale waste disposal facilities are restricted.

In addition to common incinerators, pyrolysis systems have also been used in waste disposal systems. Pyrolysis is a thermochemical decomposition of organic material at elevated temperatures in the absence of oxygen, and in these systems, the pyrolysis reaction is obtained by an internal plasma arc or an external heating. The advantage of using a pyrolysis reactor instead of an incinerator is the low environmental impact in terms of air pollution and discharge of residues. In addition to char, the pyrolysis reactor produces syngas and/or bio oil, which may be used for fueling a boiler and/or a gas turbine to produce energy as heat or electric power. Although the known waste disposal systems, using such pyrolysis reactors, are in many ways superior to the systems using incinerators, there still remains a large potential for improvement.

A recent and important development in the art of pyrolysis is the microwave-assisted pyrolysis reactor. In these reactors, microwaves are used to heat the material to be pyrolyzed.

Waste disposal systems using microwave reactors for microwave-assisted pyrolysis are known. Examples of such systems are disclosed in for instance U.S. Pat. Nos. 5,387, 321 and 6,184,427 B1. The physical principles, effects and advantages of using microwave-assisted pyrolysis in waste disposal and waste to energy applications are reviewed by Lam et al. *Energies* 2012, 5, 4209-4232.

The goal of the present invention is to provide a microwave-assisted pyrolysis reactor suitable for microwave-assisted pyrolysis of various types of waste in a waste disposal system. In particular, the present invention provides a microwave reactor, which has a simple construction, is robust regarding the type and size distribution of waste being pyrolyzed and which is not dependent on a complex solution for moving the waste to be pyrolyzed through the reactor. A further aim of the invention is to alleviate or remove at least some of the disadvantages of the prior art microwave-assisted pyrolysis reactors and waste disposal systems.

SUMMARY OF THE INVENTION

The present invention is defined by the appended claims and in the following:

In a first aspect, the present invention provides a microwave pyrolysis reactor comprising an inner pipe element and a housing, wherein
  the inner pipe element is made of a microwave transparent material and comprises a first open end and a second open end;
  the housing comprises a first inner surface, enclosing an annular space around the inner pipe element, a waste inlet, a solids outlet, a gas outlet, an inert gas inlet and a port for a microwave waveguide, the waste inlet and the solids outlet are in communication with the first open end and the second open end of the inner pipe element, respectively, and the port for a microwave waveguide is in communication with the annular space; and
  wherein the inner pipe element is arranged with the first open end at a higher vertical level than the second open end, such that a material entering the waste inlet during use is transported through the inner pipe element, from the first open end to the second open end, by gravity; and
  wherein the gas outlet is arranged upstream the first open end of the inner pipe element and downstream the waste inlet of the housing, and the inert gas inlet is arranged to provide an inert gas into the annular space during use.

In an embodiment, the microwave pyrolysis reactor comprises a waste inlet assembly in communication with the waste inlet and arranged to provide a material to be pyrolyzed to the first open end of the inner pipe element in a gastight manner, and a solids outlet assembly in communication with the solids outlet and arranged to allow a material to exit the microwave pyrolysis reactor in a gastight manner. The term "gastight manner" is intended to mean that a material is transferred into and out of the pyrolysis reactor in a manner which prevents ambient gas, i.e. air/oxygen, from being sucked into the inner pipe element of the reactor.

In an embodiment of the microwave pyrolysis reactor, at least one of the waste inlet assembly and the solids outlet assembly comprises a waste inlet chamber and a solids outlet chamber, respectively.

In an embodiment of the microwave pyrolysis reactor, each of the waste inlet chamber and the solids outlet chamber comprises a first valve and a second valve for isolating the respective chamber. The first and the second valve are preferably gate valves, and even more preferred slide gate valves.

In an embodiment of the microwave pyrolysis reactor, each of the waste inlet chamber and the solids outlet chamber comprises a gas inlet and a gas outlet for inert gas purging of the respective chamber.

In an embodiment, the microwave pyrolysis reactor comprises a pressure sensor for monitoring the pressure within the annular space.

In an embodiment of the microwave pyrolysis reactor, the gas outlet is connectable to a gas treatment system comprising a suction device, such that a below ambient pressure is present, or may be obtained, at the gas outlet during use.

In an embodiment of the microwave pyrolysis reactor, the inert gas inlet is connectable to an inert gas source, such that an inert gas of at least ambient pressure is, or may be, present in the annular space during use.

The port for a microwave waveguide is arranged such that microwaves guided to the port from a microwave source is introduced into the annular space.

The inner pipe element, the inlet and the solids outlet of the housing form a flow path/conduit not in fluid communication with the annular space around the inner pipe element.

In one embodiment of the microwave pyrolysis reactor, the inner pipe element is substantially vertical. A vertical inner pipe element provides an optimum distribution/interaction of the gas/smoke, developed from a waste material in a lower part of the inner pipe element, with the waste material in an upper part of the inner pipe.

In one embodiment of the microwave pyrolysis reactor, the gas outlet is arranged upstream the first open end of the inner pipe element and downstream the inlet of the housing. In the present application, the term «upstream» refers to a position relative to the movement of a waste material to be pyrolyzed through the inner pipe element. Alternatively, the gas outlet may be defined as being arranged at a level above the level of the first open end of the inner pipe element.

The waste inlet may be defined as being arranged upstream the first open end of the inner pipe element and the solids outlet may be defined as being downstream the second open end of the inner pipe element.

In one embodiment, the microwave pyrolysis reactor comprises multiple ports for a microwave waveguide.

In one embodiment, the microwave pyrolysis reactor comprises a microwave blocking section arranged between the inner pipe element and the port for a microwave waveguide, such that microwaves entering through the port, during use, are prevented from direct impact on the inner pipe element.

In one embodiment of the microwave pyrolysis reactor, the microwave blocking section is a plate element facing the port for a microwave waveguide and preferably having a cross-sectional area at least equal to the port for a microwave waveguide. Preferably, the cross-sectional area of the plate element is larger than the cross-sectional area of the port.

In one embodiment of the microwave pyrolysis reactor, the waste inlet of the housing is part of an inlet section comprising a feed pipe having a first end and a second end, the waste inlet arranged at the first end of the feed pipe and the second end of the feed pipe extending inside the housing and facing the first open end of the inner pipe element, such that a circumferential space is formed between the feed pipe and a second inner surface of the housing. The circumferential space is not in fluid communication with the annular space around the inner pipe element.

In one embodiment of the microwave pyrolysis reactor, the gas outlet is arranged at the second inner surface of the housing, preferably at a level above the second end of the feed pipe.

In one embodiment of the microwave pyrolysis reactor, the waste inlet chamber and the solids outlet chamber are connected to the waste inlet and the solids outlet, respectively, of the housing.

In a second aspect, the present invention provides a waste treatment system comprising a microwave pyrolysis reactor according to any embodiments of the first aspect, a microwave source, a gas treatment system and an inert gas source; wherein the microwave source is connected to the port by a microwave waveguide;

the gas treatment system is connected to the gas outlet and comprises a suction device arranged such that the pressure at the gas outlet, or inside the inner pipe element, may be kept below ambient pressure during use; and the inert gas source is connected to the inert gas inlet, such that an inert gas of at least ambient pressure may be present in the annular space during use.

In one embodiment, the waste treatment system comprises means for providing waste to the inlet of the reactor and means for removal of solids exiting the solids outlet of the reactor.

In one embodiment of the waste treatment system, the solids outlet chamber is connected to the solids outlet of the microwave pyrolysis reactor via a solids conveyor. The solids conveyor provides a fluid tight connection between the solids outlet and the solids outlet chamber.

In a third aspect the present invention provides the use of a microwave reactor according to any of the embodiments of the first aspect, or a waste treatment system according to the second aspect, for microwave-assisted pyrolysis of a material susceptible to heating by microwaves.

In a fourth aspect, the present invention provides a method of monitoring the structural integrity of a microwave pyrolysis reactor, wherein the reactor comprises an inner pipe element made of a microwave transparent material and a housing; the housing encloses an annular space around the inner pipe element and comprises a gas outlet in fluid communication with the inner pipe element and an inert gas inlet in fluid communication with the annular space, and the method comprises the steps of:

applying suction to the gas outlet to obtain a below ambient pressure inside the inner pipe element;

introducing an inert gas to the annular space via the inert gas inlet to obtain an ambient, or above ambient, pressure in the annular space;

monitoring the pressure in the annular space during a pyrolysis reaction performed inside the inner pipe element.

In an embodiment, the method comprises the step of:

evaluating the structural integrity of the microwave pyrolysis reactor based on the pressure in the annular space.

The method of monitoring the structural integrity of a microwave pyrolysis reactor may also be termed a method of detecting leakage in a microwave pyrolysis reactor. The latter method may comprise a further step of evaluating extent or size of leakage based on the pressure in the annular space, or based on a differential pressure between the annular space and inside the inner pipe element.

The term "waste" is intended to comprise any type of material suitable for pyrolysis in a microwave reactor.

The term "vertical" used in connection with the inner pipe element refers to the direction of the centerline of the inner pipe element.

The terms "upstream" and "downstream" is relative the movement of the waste material stream from the first open end towards the second open end of the inner pipe element.

SHORT DESCRIPTION OF THE DRAWINGS

The present invention is described in detail by reference to the following drawings:

FIG. 2 is a horizontal cross-sectional view of the microwave reactor in FIG. 1.

FIG. 3 is a side-view of the microwave reactor in FIG. 1.

FIG. 4 is a perspective side-view of the microwave reactor in FIG. 1.

DETAILED DESCRIPTION OF THE INVENTION

Figure 1:
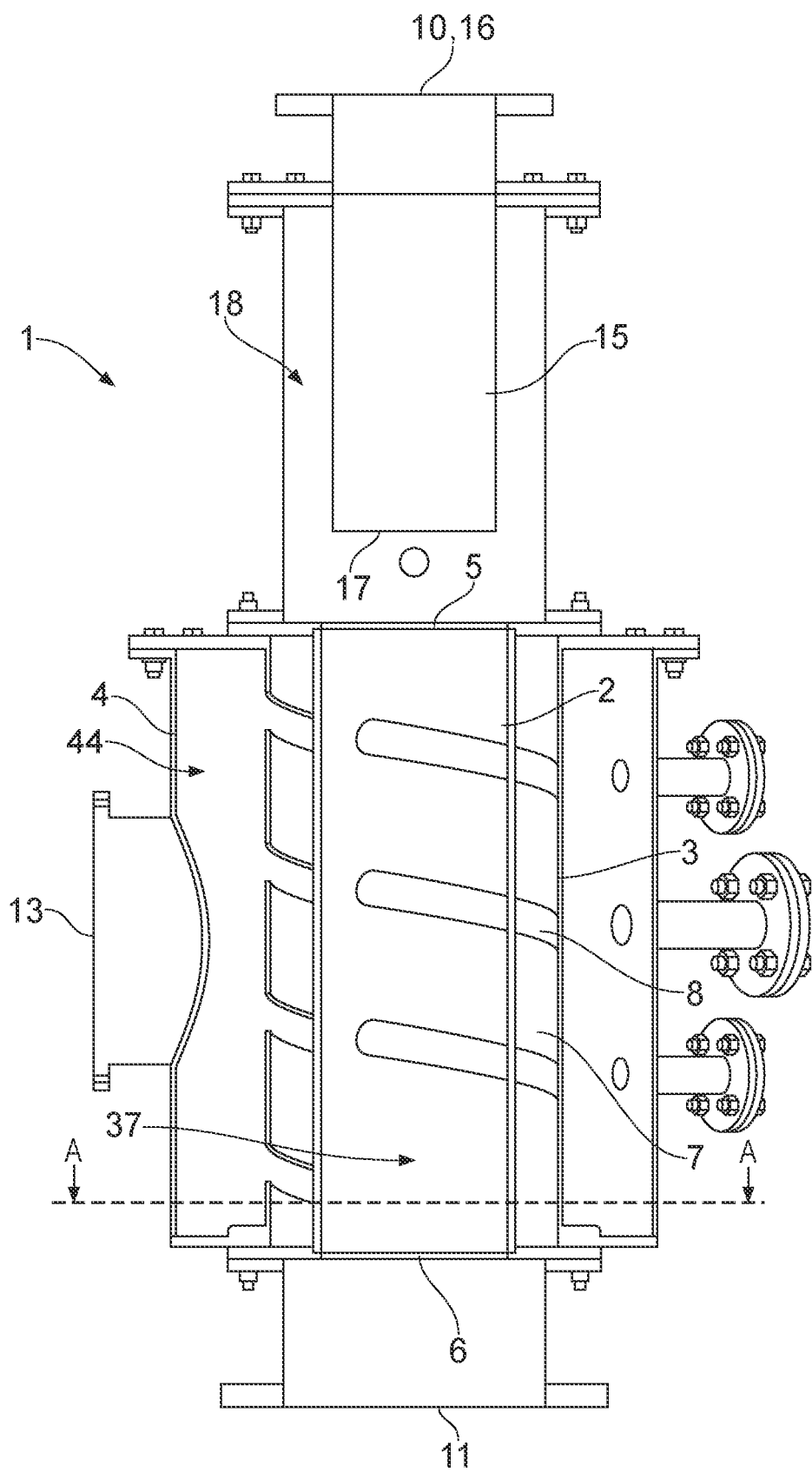
FIG. 1 is a vertical cross-sectional view of a microwave reactor according to the invention.

An embodiment of a microwave reactor according to the invention is shown in FIGS. 1-4. The reactor features an inner pipe element 2 made in a material that is transparent to microwaves. The pipe element has an upper end 5 (i.e. a first open end) and a lower end 6 (i.e. a second open end). An outer pipe element 3 (i.e. a microwave distribution element) is arranged around and concentric to the inner pipe element 2, delimiting a first annular space 7 between the inner pipe element and the outer pipe element. The housing 4 of the reactor, more particularly a first inner surface of the housing, encloses a second annular space 44 around the outer pipe element and features a port 13 for connecting the second annular space to a microwave waveguide. The waveguide is for transferring microwaves from a suitable microwave source, such as a magnetron or solid-state generator. The port 13 comprises a window (not shown) made in a material that is transparent to microwaves. The window allows microwaves to enter the housing while preventing gas from exiting the first and second annular space. The housing 4 features an inlet 10, a solids outlet 11, a gas outlet 12 and an inert gas inlet 46. The inlet and the solids outlet of the housing is arranged to communicate with the upper end and the lower end of the inner pipe element, respectively. The gas outlet 12 is arranged above the upper end of the inner pipe, such that the gas developed in a pyrolysis process is allowed to escape/exit the reactor. The inert gas inlet 46 is arranged to provide an inert gas (commonly nitrogen, but may also be any other suitable inert gas, such as carbon dioxide, argon, flue gas etc.) to the first and second annular space, i.e. the annular space between the first inner surface of the housing and the inner pipe element. The solids inlet 10 of the housing is part of an inlet section comprising a feed pipe 15 having a first end 16 and a second end 17, the solids inlet is arranged at the first end 16 of the feed pipe and the second end 17 of the feed pipe extends inside the housing and faces the upper end 5 of the inner pipe element. A circumferential space 18 is formed between the feed pipe and the housing (i.e. a second inner surface of the housing). To avoid or minimize having solid waste material being transported towards the gas outlet 12, due to the flow direction of the gaseous product, the gas outlet is arranged at the second inner surface of the housing at a level above the second end 17 of the feed pipe.

The inner pipe element 2 together with the inlet and the solids outlet of the housing is part of a flow path/conduit 37 not in fluid communication with the annular space 7, 44 around the inner pipe element.

The wall of the outer pipe element features multiple slots 8 (i.e. openings) arranged in a helical configuration (i.e. a helical slot arrangement). During use, microwaves entering the reactor via the port 13 will enter the first annular space 7 between the inner pipe element and the outer pipe element via the slots. The effect of the outer pipe element is to provide a more even distribution of the microwaves impacting a waste material inside the inner pipe element. This in turn provides for a more homogenous heating of the material.

It is noted that although providing an advantageous effect, the microwave distribution element (i.e. the inner pipe element 2) is not essential for the functionality of the reactor. In embodiments of the reactor not comprising such a microwave distribution element, the housing delimits a single annular space between the inner pipe element and the housing (i.e. an inner surface of the housing). In the following, the combined first and second annular space, is commonly termed the annular space.

In use, the microwave reactor is arranged with the inner pipe element in a vertical direction having the inlet 10 of the housing and the upper end 5 of the inner pipe element arranged at a level above the solids outlet 11 of the housing and the lower end of the inner pipe element. This provides several advantages including the feature that a waste material to be pyrolyzed is passed through the reactor simply by use of gravity. Further, during pyrolysis, gaseous or volatile products (mainly hydrocarbon gas/vapors) formed in a lower part/level of the inner pipe element will rise through the inner pipe element and interact with the waste material situated at a higher level in the inner pipe. The gaseous products have commonly a much higher microwave absorption capability than the waste material being closer to the inlet of the housing, and the resulting effect is consequently an increased microwave absorption in said waste material. The latter effect is highly advantageous since it allows for a more effective pyrolysis of the waste materials. This effect may even provide for the effective pyrolysis of materials that would otherwise require the addition of microwave absorbent additives, such as char, to obtain an effective pyrolysis.

As mentioned above, in this specific embodiment, the slots of the microwave distribution element are arranged in a helical configuration. However, a useful or suitable homogenizing effect on the microwave distribution may be obtained by other slot configurations. Further embodiments, wherein the slots are replaced by openings having various cross-sectional areas, such as circular, elliptic and polygonal are thus envisioned. A requisite is that the openings are dimensioned to allow passage of microwaves from the second annular space to the first annular space. Further, the openings are preferably arranged such that openings do not fully overlap on diametric opposite sides of the outer pipe element. By avoiding such overlap, most of the microwaves are reflected and distributed within the first annular space in the longitudinal direction of the inner pipe element.

The microwave pyrolysis reactor comprises multiple temperature sensors 42 and pressure sensors 43. The sensors monitor the temperature conditions in the reactor, as well as the pressure at the gas outlet 12 (or in the circumferential space 18) and the pressure in the first annular space 7 and the second annular space 44 (i.e. the pressure in the annular space between the inner pipe element and the first inner surface of the housing). When used in for instance a waste disposal system as described below, the various sensors are connected to a suitable control and monitoring system (not shown).

Figure 5:
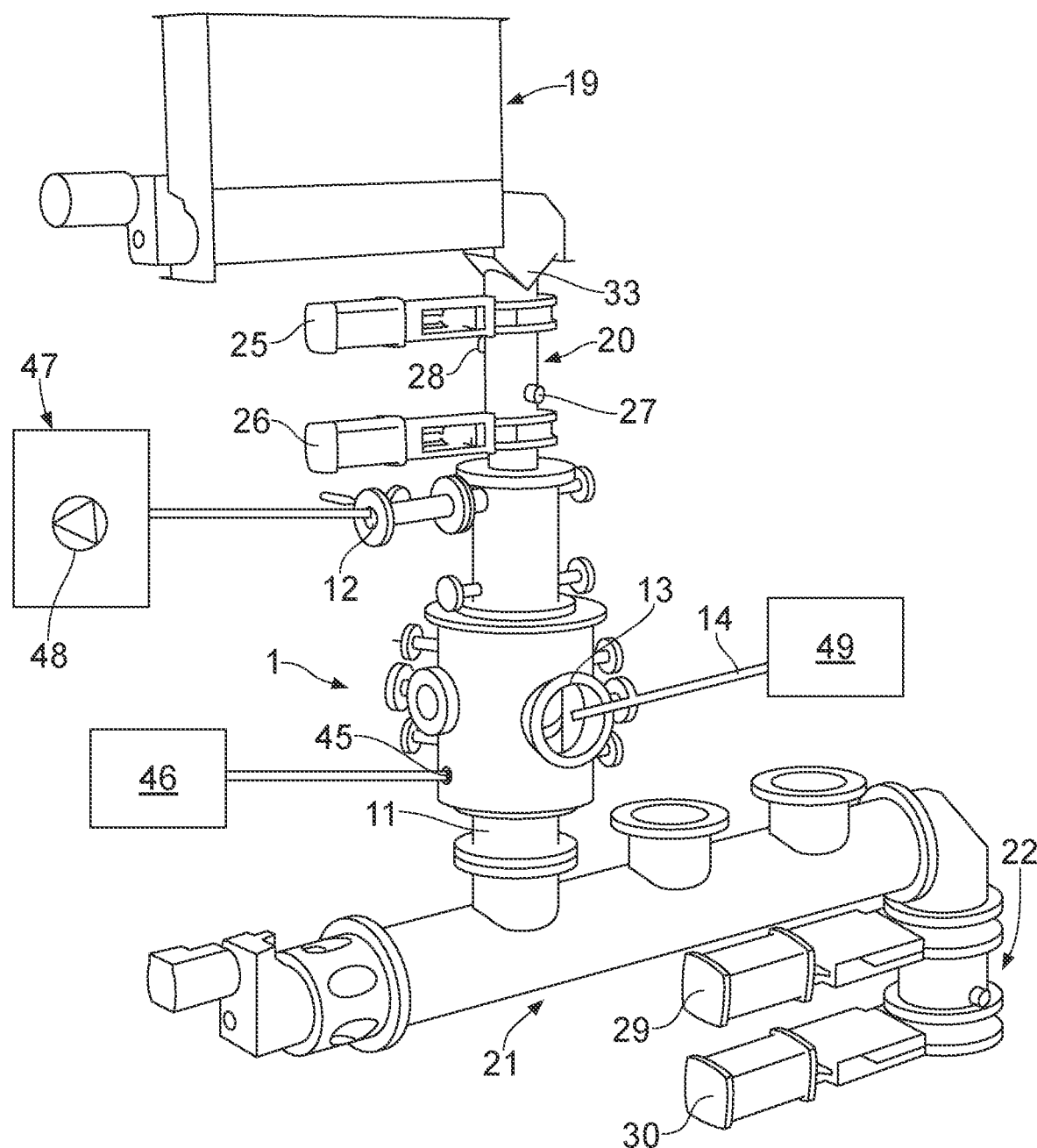
FIG. 5 is a perspective view of a waste disposal system comprising the microwave reactor in FIG. 1.

The main units of an exemplary waste disposal system, featuring a microwave reactor 1 as described above, is shown in FIG. 5. In addition to the microwave reactor, the system comprises a waste container 19, a waste inlet chamber 20, a solids conveyor 21 and a solids outlet chamber 22. The waste container comprises a waste outlet 33 and have a screw conveyor 23 (the screw is not shown) arranged to provide a waste material to the inlet 24 of the waste inlet chamber. The waste inlet chamber comprises an upper valve 25 (i.e. an inlet valve) and a lower valve 26 (i.e. an outlet valve). Both upper and lower valves are gate valves, but other suitable types of valves may be used. During a pyrolysis process, the internal volume of the inner pipe element is kept at a below ambient pressure, see description below. The valves are able to isolate the waste inlet chamber such that air/oxygen is prevented from being sucked into the reactor (i.e. into the inner pipe element 2) during feeding of the waste material. In this particular embodiment, oxygen may be purged from the waste material by use of nitrogen (i.e. an inert gas) before it enters the microwave reactor 1. The nitrogen is supplied via the gas inlet 27 and released via the gas outlet 28. However, although the nitrogen purging may be advantageous it is not a requirement since the amount of oxygen present within the isolated waste inlet chamber is small. The solids conveyor 21 is connected to the solids outlet of the microwave reactor and comprises an enclosed internal screw conveyor 34 (not shown). The screw conveyor is arranged to transport the solids exiting the microwave reactor to the solids outlet chamber 22. Other means for transport of the solids in the solids conveyor, such as belts, may also be used. The solids conveyor is dimensioned (i.e. have a length and/or circumference) such that the solids exiting the microwave reactor is allowed to cool sufficiently before they reach the solids outlet chamber. It is contemplated that the solids conveyor may comprise a heat exchange system for improving the cooling of the solids exiting the solids outlet 10. In addition to improving the cooling of the solids, such a heat exchange system may for instance be used to utilize the heat in various auxiliary systems, such as preheating of water.

The solids conveyor comprises temperature probes to monitor the temperature of the solids during transport from the solids outlet 11 to the solids outlet chamber 22. The solids outlet chamber 22 comprises an upper valve 29 (i.e. an inlet valve) and a lower valve 30 (i.e. an outlet valve). The valves are able to isolate the solids outlet chamber such that oxygen or air is prevented from being sucked into the solids conveyor (and consequently the inner pipe element of the microwave reactor). Similar to the waste inlet chamber, any oxygen in the solids outlet chamber may be purged by use of nitrogen via a gas inlet 31 and a gas outlet 32 (not shown), but this is not a requirement. The solids outlet 35 of the solids outlet chamber is commonly connected to a solids container 36 (not shown) for temporary storage of the solids.

In other embodiments, the inlet chamber and the outlet chamber may be arranged in other positions, such as having the outlet chamber arranged upstream the solids conveyor, the inlet chamber arranged upstream the waste container etc., provided the inlet chamber and the outlet chamber is able to prevent oxygen or air from being sucked into the inner pipe element 2 and the flow path/conduit 37 during the whole pyrolysis process, including the steps of feeding the waste material and emptying the solids. Although considered to provide the most effective and durable solution for providing an isolatable/gastight inlet/outlet assembly, the described inlet/outlet chambers may alternatively be replaced by any suitable inlet/outlet assembly able to supply waste material into the reactor (or solids out of the reactor) without allowing air being sucked in due to the below ambient pressure in the inner pipe element. Such alternative assemblies are disclosed in for instance CN103923673A and WO 2013/077748A1, and are incorporated by reference.

The gas outlet 12 of the microwave pyrolysis reactor is connected to a gas handling system 47 for processing and/or storage of the gaseous products formed in the reactor. The gas handling system comprises at least a suction device 48 (i.e. a gas fan/compressor/pump). The suction device 48 provides a below ambient pressure at the gas outlet 12. Thus, most or all of the internal volume of the inner pipe element, as well as the internal volume of the reactor in direct fluid communication with the inner pipe element, is also kept at a pressure below ambient during use. The below ambient pressure provides a highly efficient transport of the gaseous products out of the microwave reactor. The pressure at the gas outlet 12 may for instance be kept at about 5-15 mbar below ambient pressure. It is noted that in some circumstances, the pressure in the lowermost parts of the inner pipe element may reach above ambient pressure due to the gaseous products being formed and the increased flow resistance these products encounter towards the gas outlet 12. However, this will not have an effect on the below discussed advantages of the reactor and system.

The below ambient pressure provided by the suction device 48 ensures that loss of mechanical/structural integrity of the inner pipe element 2, or any sealing elements separating the internal volume of the inner pipe from its surroundings (i.e. the annular space 7, 44) may easily be detected by monitoring the pressure within the annular space by use of the pressure sensors 43. Loss of mechanical/structural integrity may for instance be due to cracks in the inner pipe element or faulty sealing. The pressure sensors 43 communicate with a control system, such that the waste treatment system is shut down before any further damage may occur. The ability to efficiently detect loss of mechanical integrity and stopping the pyrolysis process is important, since air/oxygen sucked into the reactor may cause an explosive reaction with the gaseous products.

To remove any remaining risk of air/oxygen being mixed with the gaseous products during a loss of mechanical/structural integrity, the annular space is filled with an inert gas from an inert gas source 46 via the inert gas inlet 45. The inert gas (commonly nitrogen, but any suitable type of inert gas may be used) in the annular space is kept at minimum ambient pressure (or above), which pressure is monitored by the pressure sensors 43. The pressure of the inert gas may for instance be kept at about 5-15 mbar above ambient pressure. The ΔP of the pressure in the annular space and at the gas outlet 12 may for instance be in the range of 10-30 mbar. If mechanical integrity is lost, as discussed above, only inert gas will be sucked into the inner pipe element or the flow path/conduit 37. The inert gas source 46 will provide inert gas to the annular space until the pyrolysis process is safely shut down.

The gas handling system 47 may in addition to the suction device 48, comprise any suitable device or system for condensing/separating at least part of the gaseous products into condensates and gas, storage systems for gas and condensates, systems for generating heat and/or electric power, such as a gas driven generator or an oil furnace. In one embodiment, the inert gas source 46 may be connected to one of the systems for generating heat and/or electric power, such that flue gas may be used as the inert gas.

In use, a waste material is first provided to the waste container 19. The waste container may for instance be connected to, or constitute a part of, a shredder, a pelletizer and/or waste storage hopper for providing waste material on a form suitable for introduction to the reactor. In a feeding sequence, the waste material, preferably a pelletized waste material, is transported to the outlet 33 of the waste container, the upper valve 25 of the waste inlet chamber is opened and the waste material introduced into the waste inlet chamber. After introduction, the upper valve is closed and the waste inlet chamber purged by nitrogen (or any suitable inert gas) via the gas inlet 27 and the gas outlet 28. After purging, the lower valve is opened and the waste material allowed to enter the microwave reactor via the upper inlet 10 due to gravity. The lower valve is closed and the waste material is pyrolyzed by use of microwaves from a microwave waveguide connecting a microwave source to the port 13.

A level sensor arranged in the reactor detects when a suitably low level of material in the inner pipe element is reached, and the above feeding sequence is repeated to provide a new batch of waste material to the reactor. Initially, the waste material in the inner pipe element is at the same level of pyrolysis throughout the inner pipe element, however, after a certain time with repeated batches of introduced material, the material closest to the solids outlet 11 is fully pyrolyzed, i.e. is predominantly char, while the material closest to the inlet 10 is not.

Upon entering the microwave reactor through the port 13, the microwaves enter the annular space 7 and the inner pipe element via the slot(s) 8 and are distributed inside the inner pipe element 2. During pyrolysis, the waste material is mainly transformed to solids and gaseous material, wherein the solids consist predominantly of char and the gaseous material consists predominantly of hydrocarbon gas/vapors. Commonly, the pyrolysis is run within a temperature range of 300-600° C. The hydrocarbon gas/vapors are allowed to exit the reactor via the gas outlet 12. When pyrolysis of at least a lower portion of the waste material, i.e. the portion closest to the solids outlet 11 of the reactor, is completed, the solids conveyor 21 moves the solids towards the solids outlet chamber 22. An advantage of having the inner pipe element arranged in a vertical direction is that any hydrocarbon gas/vapor developed in the process will pass through the waste material, which is between the position where the gas is developed and the gas outlet. This feature provides an increased microwave absorption of the waste material as discussed above.

When the solids outlet is full, the upper valve 29 is closed and the lower valve is opened, such that the solids are allowed to exit the solids outlet chamber. After exit of the solids, the lower valve 30 is closed, the solids outlet chamber purged of oxygen, and the upper valve 29 opened to receive a new batch of solids. Commonly, the solids outlet chamber is connected to a solids container for intermediate storage of the solids.

Both the waste inlet chamber and the solids outlet chamber may optionally comprise an arrangement for evacuating gas/air out of the chamber, for instance a gas valve connected to a suction device. By combining the nitrogen purging with a prior evacuation of the chamber, the required amount of nitrogen gas may be reduced.

Suitable microwave transparent materials for use in the inner pipe element 1 include glass materials such as borosilicate or quartz, as well as various ceramics having low dielectric loss, such as boron nitride based ceramics.

The use of microwaves to heat the material to be pyrolyzed entails that said material should preferably have certain intrinsic properties, i.e. having an electric dipole and a high ability to absorb microwaves at a wavelength $\lambda$ of between 12 cm and 32 cm. In many instances, the waste materials will be highly heterogenous, and not all will possess the required properties for effective microwave heating. In the latter case, despite the advantageous effect of having the vertical inner pipe element as discussed above, it may be required or advantageous to mix the waste material with an auxiliary material prior to introduction in the microwave reactor. Such auxiliary material may for instance be char previously produced in the microwave reactor. However, even if such auxiliary material is required, the vertical inner pipe element and its advantageous effect will minimize the amount of such material.

The disclosed microwave pyrolysis reactor is primarily described by its use in the disposal of waste materials, wherein the obtained products, e.g. char, oil and tar, are not the main goal of the pyrolysis process. However, the obtained products, as well as the heat energy produced in the process, are valuable and it is envisioned that the reactor and waste treatment system may be used in processes, wherein the obtained products and/or the produced heat energy are the main goal. Such processes may for instance be the production of biofuel by pyrolysis of wood-based raw materials, energy production and similar. Thus, the term waste treatment system is intended to also cover systems such as biofuel and power plants.

The invention claimed is:

1. A microwave pyrolysis reactor (1) comprising an inner pipe element (2) and a housing (4), wherein
   the inner pipe element (2) is made of a microwave transparent material and comprises a first open end (5) and a second open end (6);
   the housing (4) comprises a first inner surface, enclosing an annular space (7,44) around the inner pipe element (2), a waste inlet (10), a solids outlet (11), a gas outlet (12), an inert gas inlet (45) and a port (13) for a microwave waveguide (14), the waste inlet and the solids outlet are in communication with the first open end and the second open end of the inner pipe element, respectively, the gas outlet (12) is in fluid communication with the inner pipe element, and the port for a microwave waveguide is in communication with the annular space; and
   wherein the inner pipe element is arranged with the first open end at a higher vertical level than the second open end, such that a material entering the waste inlet during use is transported through the inner pipe element, from the first open end to the second open end, by gravity; and
   wherein the inert gas inlet (45) is arranged to provide an inert gas into the annular space (7,44) during use; and
   wherein the inner pipe element (2), together with the waste inlet (10) and the solids outlet (11), is part of a conduit (37) not in fluid communication with the annular space (7, 44) around the inner pipe element (2).

2. The microwave pyrolysis reactor according to claim 1, comprising a waste inlet assembly (20) in communication with the waste inlet (10) and arranged to provide a material to be pyrolyzed to the first open end of the inner pipe element in a gastight manner, and a solids outlet assembly (22) in communication with the solids outlet (11) and arranged to allow a material to exit the microwave pyrolysis reactor in a gastight manner.

3. The microwave pyrolysis reactor according to claim 2, wherein at least one of the waste inlet assembly and the solids outlet assembly comprises a waste inlet chamber (20) and a solids outlet chamber (22), respectively.

4. The microwave pyrolysis reactor according to claim 3, wherein each of the waste inlet chamber and the solids outlet chamber comprises a first valve (25,29) and a second valve (26,30) for isolating the respective chamber.

5. The microwave pyrolysis reactor according to claim 4, wherein each of the waste inlet chamber and the solids outlet chamber comprises a gas inlet (27) and a gas outlet (28) for inert gas purging of the respective chamber.

6. The microwave pyrolysis reactor according to claim 1, comprising a pressure sensor (43) for monitoring the pressure within the annular space (7,44).

7. The microwave pyrolysis reactor according to claim 1, wherein the gas outlet (12) is connectable to a gas treatment system (47) comprising a suction device (48), such that a below ambient pressure may be present at the gas outlet during use.

8. The microwave pyrolysis reactor according to claim 1, wherein the inert gas inlet (45) is connectable to an inert gas source (46), such that an inert gas of at least ambient pressure may be present in the annular space (7,44) during use.

9. A waste treatment system comprising a microwave pyrolysis reactor according to claim 1, a microwave source (49), a gas treatment system (47) and an inert gas source (46); wherein the microwave source (49) is connected to the port (13) by a microwave waveguide (14);

the gas treatment system (47) is connected to the gas outlet (12) and comprises a suction device (48) arranged such that the pressure at the gas outlet (12) may be kept below ambient pressure during use; and the inert gas source (46) is connected to the inert gas inlet (45), such that an inert gas of at least ambient pressure may be present in the annular space (7,44) during use.

10. A method of monitoring the structural integrity of a microwave pyrolysis reactor, wherein the reactor comprises an inner pipe element (2) made of a microwave transparent material and a housing (4); the housing encloses an annular space (7,44) around the inner pipe element (2) and comprises a gas outlet (12) in fluid communication with the inner pipe element, an inert gas inlet (45) in fluid communication with the annular space, a waste inlet (10) and a solids outlet (11), wherein the inner pipe element (2), together with the waste inlet (10) and the solids outlet (11), is part of a conduit (37) not in fluid communication with the annular space (7, 44) around the inner pipe element (2), and the method comprises the steps of:

applying suction to the gas outlet (12) to obtain a below ambient pressure inside the inner pipe element (2);

introducing an inert gas to the annular space via the inert gas inlet (45) to obtain an ambient, or above ambient, pressure in the annular space;

monitoring the pressure in the annular space during a pyrolysis reaction inside the inner pipe element.

* * * * *